Figure 1:
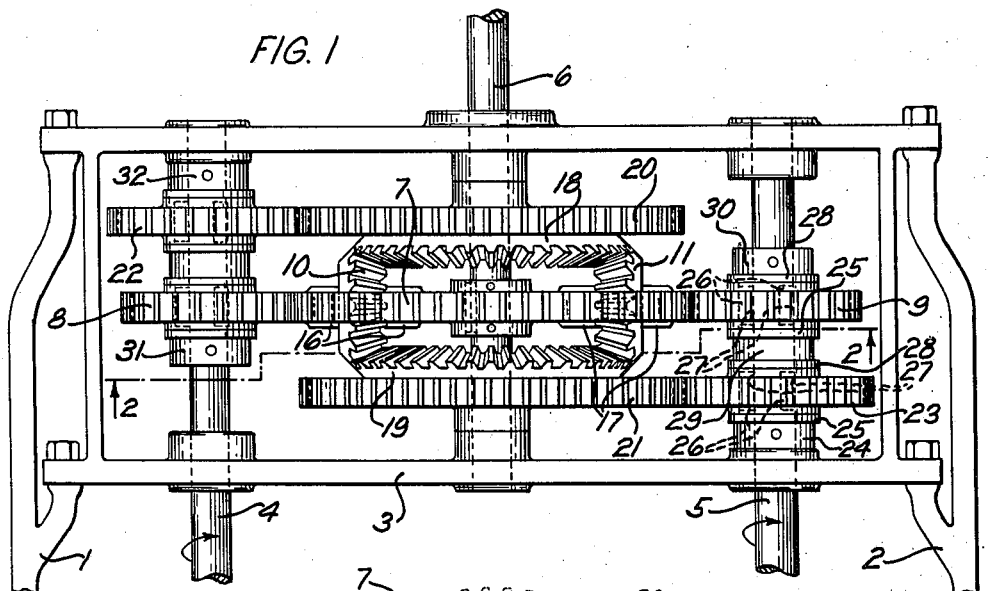

April 2, 1935.  H. G. JOHNSTONE ET AL  1,996,579

POWER TRANSMISSION DEVICE

Filed June 15, 1932

INVENTORS
H. G. JOHNSTONE
V. D. BARKER

BY *E. A. Kane*

ATTORNEY

Patented Apr. 2, 1935

1,996,579

UNITED STATES PATENT OFFICE 1,996,579

POWER TRANSMISSION DEVICE

Harold G. Johnstone, Chicago, Ill., and Virgil D. Barker, Westfield, N. J.

Application June 15, 1932, Serial No. 617,332

13 Claims. (Cl. 74—282)

This invention relates to power transmission devices, and more particularly to a mechanism for transmitting power from a plurality of prime movers on aircraft to a single propeller driving shaft.

In the operation of aircraft and particularly airplanes, safety is dependent upon a continued, unfailing supply of motive power. In an attempt to secure such continued, unfailing supply it has been proposed to equip large passenger carrying airplanes with several independent power plants. It was expected that the provision of a plurality of independent power units would permit the navigation of an airplane even though one power plant became inoperative while the airplane was in flight.

In practice this expectation has not been fully realized and serious accidents have resulted from the failure, during flight, of one or more of a plurality of aircraft motors. This has been caused due to the fact that when a plurality of independent power plants are provided some of them must of necessity be displaced laterally from the center of drag of the airplane in order to secure the greatest efficiency from the driving propellers. Then, in the event of failure of a motor which is displaced from the center of drag, the driving thrust of the propellers is unbalanced causing a large yawing moment in the direction of the inoperative motor which yawing moment will be aggravated by the wind resistance of the inoperative propeller. This large yawing moment must be overcome and necessitates the application of a great amount of rudder thereby further tending to slow down the aircraft and reducing the maneuverability of the aircraft.

The failure of one motor of multi-motored airplanes, as heretofore known, has thus made the airplanes slow down due to decreased power and increased drag thereby causing the propellers to operate at lowered efficiency and the active motors, necessarily slowed down, deliver less than their maximum power.

It is an object of the present invention to provide a simple, compact and highly efficient transmission device.

Another object of the invention is the provision of a transmission device adapted normally to be driven by a plurality of motors for transmitting power to a single shaft.

Still another object is the provision of a transmission device for aircraft power units which may be driven by either or both of a pair of motors and which transmits the power with equal efficiency from either one or both motors to a single propeller.

In accordance with one embodiment, the invention contemplates a power transmission unit particularly adapted to aircraft which is capable of supplying propeller driving energy to a propeller shaft mounted on the vertical centerline of drag of the airplane, from two motors at a predetermined propeller speed and upon failure of one motor the other motor will continue to drive the propeller shaft at a speed less than when both motors were operating, thereby to provide the maximum propeller efficiency when either one or both of the motors are operating. That is, the transmission is so arranged that either motor can drive the propeller in the event of failure of the other and, in addition, the speed ratio between the single motor and the propeller with only one motor operating can be determined independently of the ratio between the propeller and both motors when both motors are running. With such an arrangement the airplane can be built with optimum propeller and motor speed relations for each of the driving conditions. Furthermore, the transmission serves the function of a reducing gear assembly between the motors and the propeller to effect, in a well known manner, a reduction of the noise of operation of the airplane and an increase in propeller efficiency.

Figure 2:
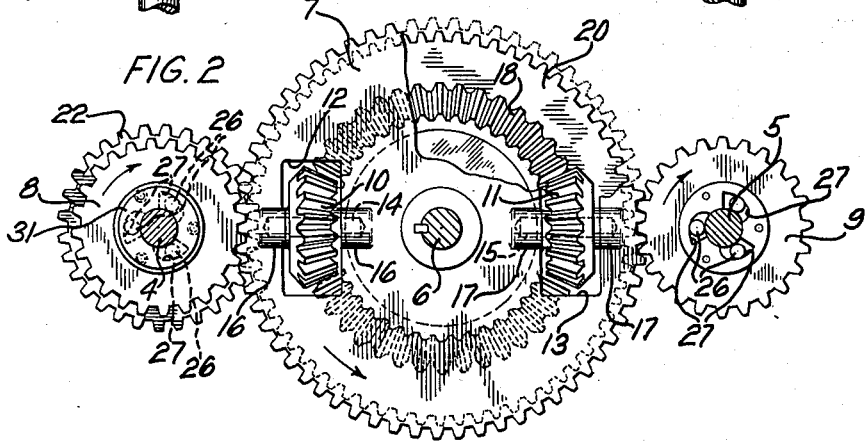

An understanding of the invention will be had by reference to the following detailed description of one embodiment thereof, when considered in conjunction with the accompanying drawing, wherein Fig. 1 is a plan view of a transmission unit, embodying the invention, with a portion of the casing removed, and Fig. 2 is a fragmentary sectional view taken substantially along the line 2—2 of Fig. 1 in the direction of the arrows.

Referring now to the drawing wherein like reference characters designate the same parts throughout the several views, the numerals 1 and 2 designate support brackets which are secured to the housings or blocks of two motors (not shown) mounted in the fuselage of an aeroplane. The brackets support a gear box 3 in which are journaled the ends of a pair of crank shafts 4 and 5 driven by the motors. The gear box also has journaled therein a short propeller shaft 6 which is interconnected with and driven by the crank shafts through a gearing arrangement mounted in the gear box 3.

Mounted upon and keyed to the propeller shaft 6 is a ring gear 7 which meshes with pinion gears 8 and 9 mounted upon the shafts 4 and 5, respectively, and which has rotatably mounted therein a pair of beveled planet pinions 10 and 11. The beveled planet pinions 10 and 11 are mounted in slots 12 and 13, respectively, cut in the ring gear and are supported on stud shafts 14 and 15 journaled in bearings 16—16 and 17—17 positioned diametrically opposite to each other on the ring gear. The beveled planet pinions 10 and 11 mesh with a pair of large beveled gears 18 and 19 which are secured to a pair of gears 20 and 21, respectively, freely rotatable on the propeller shaft 6 and meshing with a pair of pinion gears 22 and 23 mounted upon the shafts 4 and 5.

The gears 8, 9, 22 and 23 are all of the same type, differing only in size, and are mounted upon their shafts in such a manner that when the shafts 4 and 5 are rotating in the direction indicated by the arrows the gears will be driven by the shafts unless the gear is rotating at a faster rate of speed than the shaft, in which event the gear will overrun the shaft. The gears 8 and 22 are exactly the same as the gears 9 and 23, respectively, and the method of mounting for only the gears 9 and 23 will be described in detail.

Adjacent the lower wall (Fig. 1) of the gear box 3, the shaft 5 has pinned thereto a collar 24 which abuts a bearing plate 25 secured to the face of the gear 23 for holding in place a plurality of roller bearings 26—26 positioned in slots 27—27 cut in the gear 23. The slots 27—27 are tapered in the direction of the rotation of the shaft 5, so that when the shaft is rotating in the direction of the arrows, the shaft will tend to wedge the roller bearings 26—26 in the reduced portions of the slots to drive the gear, whereas if the gear is rotating faster than the shaft the shaft will force the roller bearings into the enlarged portions of the slots.

A second bearing plate 28 is secured to the other side of the gear 23 and engages a spacer member 29. The bearing plate 28 cooperates with the bearing plate 25 to hold the roller bearings 26 in their slots 27 and the spacer member 29 spaces the gear 23 from the gear 9 which is also provided with roller bearings 26—26 in slots 27—27, and bearing plates 25 and 28 and which is held in place against the spacer member 29 by a collar 30 pinned to the shaft 5.

The gears 8 and 22 are constructed and arranged in exactly the same manner as the gears 9 and 23 being held in place upon the shaft 4 by collars 31 and 32 so that when the shaft 4 is rotated in the direction indicated by the arrows the gears will be driven by the shaft unless the gears are rotated by their cooperating gears 7 and 20 at a rate of speed greater than the speed of the shaft 4, in which event the gears 8 and 22 will overrun the shaft 4 but will not drive it.

A better understanding of the invention may be had by reference to the following brief description of the operation thereof.

Assume that the motors (not shown) associated with the shafts 4 and 5 are of a type which operate at a maximum efficiency when rotating the shafts at the rate of 2000 revolutions per minute, and assume that the propeller to be used will absorb the power output of the two motors when the propeller rotates at 1000 revolutions per minute with both motors running and that it will absorb the power output of one motor at 800 revolutions per minute. With this assumed state of facts the gears 7, 8, 9, 20, 21, 22 and 23 must compare in size as follows: The gears 8 and 9 must be of the same size and must be two-fifths as large as ring gear 7; the gears 22 and 23 must be the same size and must be one-half as large as gears 20 and 21 which must be of the same size. In other words, the gears must have the following ratio with respect to each other:

gear 8: gear 7 = gear 9: gear 7 = 1:2½
gear 22: gear 20 = gear 23: gear 21 = 1:2

If both motors are rotating their shafts 4 and 5 at 2000 revolutions per minute, gears 22 and 23 will rotate at 2000 revolutions per minute to drive gears 20 and 21 at 1000 revolutions per minute and when gears 20 and 21 are driven at the same speed the planet pinions 10 and 11 will not be rotated about their respective stud shafts 14 and 15 but will be rotated about the axis of the shaft 6 at the same speed as the gears 20 and 21; that is, at 1000 revolutions per minute. The planet pinions 10 and 11 in rotating about the axis of the shaft 6 will carry the ring gear 7 with them at a speed of 1000 revolutions per minute to drive the propeller shaft 6 at 1000 revolutions per minute and since the ring gear 7 meshes with the gears 8 and 9 the gears 8 and 9 will be rotated at 2500 revolutions per minute or 500 revolutions per minute faster than their respective shafts 4 and 5 and due to the construction of the gears 8 and 9 they will overrun their shafts 4 and 5.

If one of the motors stops, for example, the motor for driving the shaft 4, and the other motor continues to rotate its shaft 5 at 2000 revolutions per minute, the shaft 5 will drive the gears 9 and 23 at 2000 revolutions per minute. The gear 9 being meshed with the ring gear 7 will drive the ring gear at 800 revolutions per minute to rotate the shaft 6 at 800 revolutions per minute and the gear 23 being meshed with the gear 21 will drive the gear 21 at 1000 revolutions per minute about the shaft 6 which is being driven by the ring gear 7 at 800 revolutions per minute.

The ring gear 7 in its rotation will carry the planet pinions 10 and 11 with it about the axis of the shaft 6 at a rate of 800 revolutions per minute and since the gear 21 is rotating in the same direction at 1000 revolutions per minute or 200 revolutions per minute faster than the speed of rotation of the planet pinions 10 and 11 about the shaft 6, there will be a differential loss of 200 revolutions per minute between the speed of the ring gear and the speed at which the planet pinions 10 and 11 will drive the gear 18. Therefore, the beveled gear 18 and the gear 20 will be driven by the planet pinions 10 and 11 at 600 revolutions per minute to cause the gear 22 to rotate at 1200 revolutions per minute since it meshes with the gear 20, and the gear 7 will drive the pinion gear 8 at a rate of 2000 revolutions per minute about its shaft 4.

Although a specific embodiment of the invention has been described and definite gear ratios have been given, it is to be understood that the invention is capable of many modifications. For example, it will be obvious that the ratios given may be varied and the transmission modified extensively to suit any combination of aircraft, motors and propellers without departing from the scope of the invention and a device of the present type can be designed by one skilled in the art so that either one or both of any two motors will drive any single propeller on an aircraft of any characteristics, or modifications may be made for special purposes. As an illustration, it may be desirable with certain combinations of aircraft and motors, in the event of failure of one motor, to operate the remaining motor at a higher speed and power output than under normal conditions and this may be accomplished by suitable modifications of the various gear ratios given in describing the specific embodiment disclosed in the specification. The invention is therefore to be limited only by the scope of the appended claims.

What is claimed is:

1. In a power transmission device, the combination of a driven member, two driving members, means for transmitting power from both of said driving members to the driven member, and an independently operable means operative upon removal of power from one of said driving members for transmitting power from the other driving member to the driven member.

2. In a power transmission device, a driven member, a plurality of power supplying shafts, a pair of gears mounted upon each power supplying shaft, gears mounted upon the driven member and individual to one of each of said pair of gears mounted upon the power supplying shafts, a gear fixed to the driven member and operatively associated with the others of said pairs of gears mounted upon the power supplying shafts, and means interconnecting said pair of gears individual to the gears on the power supplying shafts to cause said last mentioned pair of gears to drive the driven member when both of the power supplying shafts are operating and to cause one of said gears common to the gear fixed to the driven member to drive the driven member when one of said power supplying shafts is not operated.

3. A power transmission device comprising a driven member, a plurality of driving members, means interconnecting the driven member and the driving members including means for transmitting power from all of said driving members to the driven member at a predetermined ratio between each driving member and the driven member, and normally inoperative interconnecting means operative upon a decrease in speed of one of said driving members for transmitting power from the other driving members to the driven member at a reduced ratio.

4. A power transmission device comprising a driven member, a plurality of driving members, means interconnecting the driven member and the driving members including means for transmitting power from all the driving members to the driven member at a predetermined ratio between the driven member and each driving member, and separate interconnecting means operative upon a decrease in speed of one of the driving members for changing the ratios between the driven member and the other driving member.

5. A power transmission device comprising a driven shaft, a pair of driving shafts, means interconnecting the driving and driven shafts, and means for varying the speed ratios by a separate means for varying the speed ratios by a separate interconnection between the driving and driven shafts when the torque ratio between the driving shafts varies.

6. A power transmission device comprising a driven shaft, a pair of driving shafts, means interconnecting the driving and driven shafts, and means operative upon a variance in the speeds of the driving shafts for interconnecting the driving and driven shafts independently of the first named interconnecting means.

7. A power transmission device comprising a driven shaft, a pair of driving shafts, means interconnecting the driving shafts with the driven shaft, and a separate interconnecting means for varying the speed ratio between one driving shaft and the driven shaft upon a change of torque supplied to the other driving shaft.

8. In a power transmission device, a driven shaft, two driving shafts, means for differentially transmitting power from both of the driving shafts to the driven shaft, and means operable upon a reduction of the speed of either driving shaft for transmitting power independently of said differential means from the other driving shaft to the driven shaft.

9. In a power transmission device, a driven shaft, two driving shafts, gears for transmitting power from both of the driving shafts to the driven shaft at a predetermined speed ratio, and normally inoperative gears operable upon a reduction of the speed of either driving shaft for transmitting power from the other driving shaft to the driven shaft at another predetermined speed ratio.

10. In a power transmission device, a driven shaft, a plurality of driving shafts, gears for differentially connecting all of the driving shafts to the driven shaft, and a gear associated with each driving shaft for automatically connecting said shaft independently to the driven shaft upon a failure of power in others of the driving shafts.

11. In a power transmission device, a driven shaft, two driving shafts, differential gearing for connecting both of the driving shafts to the driven shaft and additional gearing associated with each of said driving shafts, to automatically connect either one of the driving shafts to the driven shaft upon the failure of power in the other driving shaft.

12. In a power transmission device, a driven shaft, two driving shafts, differential gearing for connecting both of the driving shafts to the driven shaft and non-differential gearing, normally inoperative, for automatically connecting either driving shaft to the driven shaft upon failure of power in the other driving shaft.

13. In a power transmission device, a driven shaft, two driving shafts, means for transmitting a common drive from both driving shafts to the driven shaft, and normally inoperative means associated with each of said driving shafts arranged to become operative automatically for transmitting an individual drive to the driven shaft from said associated driving shaft upon failure of power in the other driving shaft.

HAROLD G. JOHNSTONE.
VIRGIL D. BARKER.